(12) United States Patent
Jun et al.

(10) Patent No.: US 11,079,876 B2
(45) Date of Patent: Aug. 3, 2021

(54) TOUCH DISPLAY DEVICE, TOUCH DRIVING CIRCUIT AND TOUCH DRIVING METHOD THEREOF

(71) Applicant: LG Display Co., Ltd., Seoul (KR)

(72) Inventors: Jaehun Jun, Seoul (KR); HyeongWon Kang, Seoul (KR); MyungHo Shin, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/115,558

(22) Filed: Dec. 8, 2020

(65) Prior Publication Data
US 2021/0200415 A1  Jul. 1, 2021

(30) Foreign Application Priority Data
Dec. 31, 2019 (KR) .................. 10-2019-0179283

(51) Int. Cl.
*G06F 3/041* (2006.01)
*G09G 3/20* (2006.01)
*G06F 3/044* (2006.01)

(52) U.S. Cl.
CPC .......... *G06F 3/04166* (2019.05); *G06F 3/044* (2013.01); *G06F 3/0418* (2013.01); *G09G 3/20* (2013.01)

(58) Field of Classification Search
CPC .... G06F 3/04166; G06F 3/0418; G06F 3/044; G09G 3/20
See application file for complete search history.

(56) References Cited

U.S. PATENT DOCUMENTS

2015/0355765 A1* 12/2015 Fukushima ........... G06F 3/0443
345/174
2017/0285847 A1* 10/2017 Uehara ................. G06F 3/0446

* cited by examiner

*Primary Examiner* — Michael Pervan
(74) *Attorney, Agent, or Firm* — Seed IP Law Group LLP

(57) ABSTRACT

Embodiments of the present disclosure relate to a touch display device, a touch driving circuit, and a touch driving method, and more specifically, to a touch display device, a touch driving circuit, and a touch driving method for enabling a signal-to-noise ratio (SNR) and sensitivity of touch sensing to be improved by implementing a code division sensing effect for the self-capacitance sensing scheme.

18 Claims, 9 Drawing Sheets

TOUCH DISPLAY DEVICE, TOUCH DRIVING CIRCUIT AND TOUCH DRIVING METHOD THEREOF

CROSS-REFERENCE TO RELATED APPLICATION

This application claims the priority benefit of Korean Patent Application No. 10-2019-0179283, filed on Dec. 31, 2019 in the Korean Intellectual Property Office, the disclosure of which is incorporated herein by reference in its entirety.

BACKGROUND

Technical Field

The present disclosure relates to touch display devices, touch driving circuits, and touch driving methods.

Description of the Related Art

As the information-oriented society has been developed, various needs for display devices for displaying images have increased. Recently, various types of display devices, such as a liquid crystal display (LCD) device, a plasma display panel (PDP), and an organic light emitting display device, or the like, have been utilized.

Further, a touch display device has been utilized that includes a touch-based input mechanism that is implemented in these display devices and that allows a user to input information or commands intuitively and conveniently relative to typical input mechanisms, such as buttons, keyboards, and mice.

In order for such a touch display device to provide a touch-based input interface, the touch display device is required to have a capability accurately to detect a touch presence from a user and detect a touch coordinate.

The touch display device typically uses a common electrode for driving each pixel as a touch electrode for touch sensing. Accordingly, during a display driving period, a common voltage is provided to a thin film transistor, and during a touch sensing period, a touch driving signal is provided to a touch electrode.

To do this, among various types of touch sensing schemes, a capacitance-based touch sensing scheme has become widespread in use which includes detecting a touch presence, a touch coordinate, and the like based on a change in capacitance formed across a plurality of touch electrodes arranged in a display panel.

Such a capacitance-based touch sensing scheme may include a mutual-capacitance sensing scheme and a self-capacitance sensing scheme.

In the case of the mutual-capacitance sensing scheme, a plurality of touch electrodes includes one or more driving electrodes to which one or more touch driving signals are applied through one or more touch driving lines, and one or more sensing electrodes for sensing one or more touch sensing signals through one or more touch sensing lines and causing capacitance with one or more driving electrodes to be formed. In this scheme, a touch presence, a touch coordinate, and the like can be detected based on a change in mutual capacitance formed between the driving electrodes and the sensing electrodes according to the presence or absence of a pointer from a finger, an active or passive pen, or the like.

Meanwhile, in the case of self-capacitance sensing scheme, each touch electrode serves as both a driving electrode and a sensing electrode. That is, a touch driving signal is applied to each touch electrode, and a touch sensing signal is received through the touch electrode to which touch driving signal is applied. In this scheme, a touch presence, a touch coordinate, and the like can be detected based on a change in capacitance formed between the touch electrode and a point from a finger, an active or passive pen, or the like.

Recently, in the mutual-capacitance sensing scheme, to improve a signal-to-noise ratio (SNR) and sensitivity of touch sensing, a method has been provided of applying a touch driving signal as a code division waveform varying over time to a driving electrode.

However, in the case of the self-capacitance sensing scheme, since both a touch driving signal and a touch sensing signal are provided through one touch line connected to one touch electrode, a touch driving signal cannot be applied as various waveforms varying over time.

BRIEF SUMMARY

In accordance with embodiments of the present disclosure, a touch display device, a touch driving circuit, and a touch driving method are provided for enabling a signal-to-noise ratio (SNR) and sensitivity of touch sensing to be improved by implementing a code division sensing effect for the self-capacitance sensing scheme.

Further, in accordance with embodiments of the present disclosure, a touch display device, a touch driving circuit, and a touch driving method are provided for enabling a code division sensing effect for the self-capacitance sensing scheme to be implemented by sensing a plurality of touch electrodes in a code division form.

Further, in accordance with embodiments of the present disclosure, a touch display device, a touch driving circuit, and a touch driving method are provided for enabling a magnitude of a touch driving signal for driving a touch electrode and power consumption to be reduced by sensing a plurality of touch electrodes in the code division form.

Further, in accordance with embodiments of the present disclosure, a touch display device, a touch driving circuit, and a touch driving method are provided for enabling noises to be reduced and stable touch driving to be performed by applying a multiple frequency sensing scheme, together with the self-capacitance sensing scheme in which a plurality of touch electrodes is sensed in the code division form.

Further, in accordance with embodiments of the present disclosure, a touch display device, a touch driving circuit, and a touch driving method are provided for enabling saturation of a touch driving circuit to be prevented effectively by controlling a level of a touch driving signal for driving a touch electrode to be different from a level of a reference voltage.

In accordance with one aspect of the present disclosure, a touch display device is provided that includes a touch panel including a plurality of touch electrodes and a plurality of touch lines, a multiplexer connected to the touch electrodes through the touch lines and outputting a code division sensing signal obtained by adding, in a code division form, touch sensing signals provided from a plurality of touch electrodes selected by code division control signals, and a touch sensing circuit calculating capacitances in the touch electrodes based on the code division sensing signal from the multiplexer and detecting a touch presence or a touch coordinate.

The touch panel of the touch display device may allow self-capacitance sensing to be implemented, in which a touch driving signal and a touch sensing signal are provided through one touch line connected to one touch electrode.

The multiplexer of the touch display device may include a plurality of multiplexers, to each of which a plurality of touch electrodes is connected as one group.

The touch sensing circuit of the touch display device may include: a preamplifier circuit including an operational amplifier receiving a code division sensing signal through an inverting input terminal and receiving a touch driving signal through an non-inverting input terminal, a feedback capacitor connected in parallel between the inverting input terminal and an output terminal of the operational amplifier, and a feedback switch; an integrating circuit including a plurality of switches and a plurality of capacitors, in order to accumulate output voltages of the preamplifier circuit; and a sampling circuit providing an output signal of the integrating circuit at any time.

The touch driving signal in the touch display device may be one or more sine wave signal(s) including a plurality of frequency components.

The touch driving signal in the touch display device may have a peak-to-peak value different from a load-free driving signal applied to a plurality of touch electrodes through the multiplexer.

The touch sensing circuit of the touch display device may calculate capacitances across one or more touch electrode(s) using a decoding code corresponding to an inverse matrix of code division control signals.

In accordance with another aspect of the present disclosure, a touch driving circuit is provided that includes a multiplexer connected to the touch electrodes through the touch lines and outputting a code division sensing signal obtained by adding, in a code division form, touch sensing signals provided from a plurality of touch electrodes selected by code division control signals, and a touch sensing circuit calculating capacitances in the touch electrodes based on the code division sensing signal from the multiplexer and detecting a touch presence or a touch coordinate.

In accordance with further another aspect of the present disclosure, a touch driving method is provided of receiving touch sensing signals from a plurality of touch electrodes arranged in a touch panel and detecting a touch presence or a touch coordinate, the method including: applying code division control signals to a multiplexer connected to the plurality of touch electrodes through a plurality of touch lines, outputting a code division sensing signal, through the multiplexer, which are obtained by adding, in a code division form, touch sensing signals provided from a plurality of touch electrodes selected by the code division control signals, and detecting a touch presence or a touch coordinate by calculating capacitances in the touch electrodes based on the code division sensing signal from the multiplexer.

In accordance with yet another aspect of the present disclosure, a touch display device is provided that includes a touch panel including a plurality of touch electrodes and a plurality of touch lines, and a touch driving circuit for sensing the touch electrodes through the touch lines. The touch driving circuit includes a first multiplexer including n touch line channel ports (n is a natural number greater than or equal to 3) that are electrically connected to n touch electrodes through n touch lines, and during a first period of a touch panel, concurrently applies a touch driving signal to (n−k) touch electrodes (k is a number smaller than n by 1 or more) among touch electrodes connected with the n touch line channel ports and concurrently applies a load-free driving signal with a same phase to the touch driving signal to k touch electrodes.

In accordance with embodiments of the present disclosure, it is possible to provide a touch display device, a touch driving circuit, and a touch driving method for enabling a signal-to-noise ratio (SNR) and sensitivity of touch sensing to be improved by implementing a code division sensing effect for the self-capacitance sensing scheme.

Further, in accordance with embodiments of the present disclosure, it is possible to provide a touch display device, a touch driving circuit, and a touch driving method for enabling a code division sensing effect for the self-capacitance sensing scheme to be implemented by sensing a plurality of touch electrodes in the code division form.

Further, in accordance with embodiments of the present disclosure, it is possible to provide a touch display device, a touch driving circuit, and a touch driving method for enabling a magnitude of a touch driving signal for driving a touch electrode and power consumption to be reduced by sensing a plurality of touch electrodes in the code division form.

Further, in accordance with embodiments of the present disclosure, it is possible to provide a touch display device, a touch driving circuit, and a touch driving method for enabling noises to be reduced and stable touch driving to be performed by applying a multiple frequency sensing scheme, together with the self-capacitance sensing scheme in which a plurality of touch electrodes is sensed in the code division form.

Further, in accordance with embodiments of the present disclosure, it is possible to provide a touch display device, a touch driving circuit, and a touch driving method for enabling saturation of a touch driving circuit to be prevented effectively by controlling a level of a touch driving signal for driving a touch electrode to be different from a level of a reference voltage.

BRIEF DESCRIPTION OF THE SEVERAL VIEWS OF THE DRAWINGS

FIG. 5A and FIG. 5B illustrate examples of a cyclic code and a decoding matrix used as code division control signals in the touch display device according to embodiments of the present disclosure.

DETAILED DESCRIPTION

Figure 1:
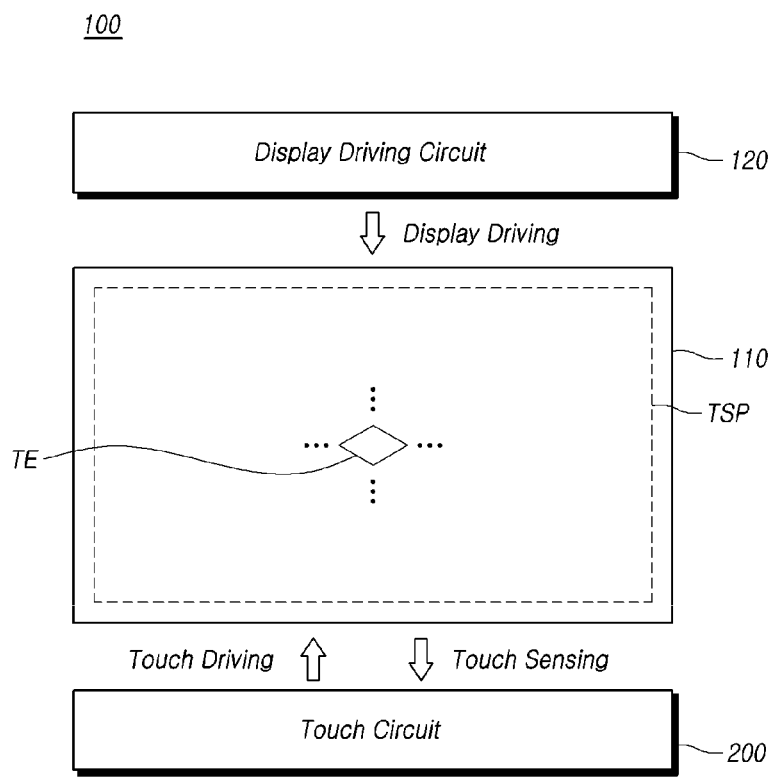
FIG. 1 illustrates a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a touch display device according to embodiments of the present disclosure.

Referring to FIG. 1, the display device 100 according to embodiments of the present disclosure may have a function of displaying images and a function of sensing a touch from a user or a conductive object.

In order for both the image displaying function and the touch sensing function to be implemented, the touch display device 100 may include a display panel 110 on which a plurality of data lines and a plurality of gate lines are arranged, a display driving circuit 120 for driving the display panel 110, and the like.

In terms of functionality, the display driving circuit 120 may include a data driving circuit for driving the data lines, a gate driving circuit for driving the gate lines, a controller for controlling the data driving circuit and the gate driving circuit, and the like. The display driving circuit 120 may be implemented as one or more integrated circuits.

The touch display device 100 may include a touch panel TSP on which a plurality of touch electrodes TE for touch sensing are arranged, a touch driving circuit 200 for driving the touch panel TSP and processing the sensing of a touch, and the like.

The touch panel TSP in the touch display device 100 may be an external type in which a touch panel TSP is fabricated separately from the display panel 110 and thereafter bonded with the display panel 110, or an embedded type in which the touch panel TSP is fabricated together when the display panel 110 is fabricated and located inside of the display panel 110.

Thus, the touch panel TSP in touch display device 100 according to embodiments of the present disclosure may be an independent panel having the touch sensing function, or mean a display panel 110 having the display function, together with the touch sensing function. Hereinafter, for convenience of description, it is assumed that the display panel 110 includes the touch panel TSP.

For driving the display panel 110, the touch driving circuit 200 can provide a touch driving signal to the display panel 110, receive a touch sensing signal from the display panel 110, and based on this, detect a touch presence or a touch coordinate.

The touch driving circuit 200 may include a touch sensing circuit providing a touch driving signal and receiving a touch sensing signal, and a touch controller detecting a touch presence or a touch coordinate.

The touch driving circuit 200 may be implemented as one or more components (e.g., one or more integrated circuits), or implemented separately from the display driving circuit 120.

Further, all or at least a part of the touch driving circuit 200 may be implemented by being integrated with the display driving circuit 120 or a circuit inside of the display driving circuit 120. For example, the touch sensing circuit of the touch driving circuit 200 may be implemented as an integrated circuit by being integrated with the data driving circuit of the display driving circuit 120.

Meanwhile, the touch display device 100 can sense a touch presence or a touch coordinate based on capacitance formed through touch electrodes TE.

The touch display device 100 can sense a touch using a mutual-capacitance sensing scheme or a self-capacitance sensing scheme, as a capacitance-based touch sensing scheme.

In the case of the mutual-capacitance sensing scheme, a plurality of touch electrodes TE may include driving electrodes to which touch sensing signals are applied through driving lines, and sensing electrodes configured to provide sensing signals through sensing lines and form capacitances with the driving electrodes. Here, the driving line and the sensing line may be referred to as a touch line TL.

In the case of the mutual-capacitance sensing scheme, the touch presence and a touch coordinate may be detected based on a change in mutual capacitance formed between the driving electrode and the sensing electrode according to the presence or absence of a pointer, such as a finger, a pen, or the like.

In the case of the self-capacitance sensing scheme, each touch electrode serves as both a driving electrode and a sensing electrode. That is, a touch driving signal is applied to a touch electrode TE through one touch line, and a touch sensing signal provided from the touch electrode to which the touch driving signal is applied is received through the same touch line. Accordingly, in the case of the self-capacitance sensing scheme, there is no distinction between the driving electrode and the sensing electrode and between the driving line and the sensing line.

In the case of the self-capacitance sensing scheme, the touch presence and a touch coordinate can be detected based on a change in capacitance formed between a pointer, such as a finger, a pen, or the like, and a touch electrode.

Thus, the touch display device 100 can sense a touch using the mutual-capacitance sensing scheme or the self-capacitance sensing scheme.

Further, such a touch display device 100 may be various types of display devices, such as a liquid crystal display device, an organic light emitting display device, a plasma display panel, a quantum dot display, and the like.

For example, when the touch display device 100 according to embodiments of the present disclosure is a liquid crystal display device, a plurality of touch electrodes TE may be arranged on the display panel 110, and be common electrodes to which a common voltage for display driving is applied.

Figure 2:
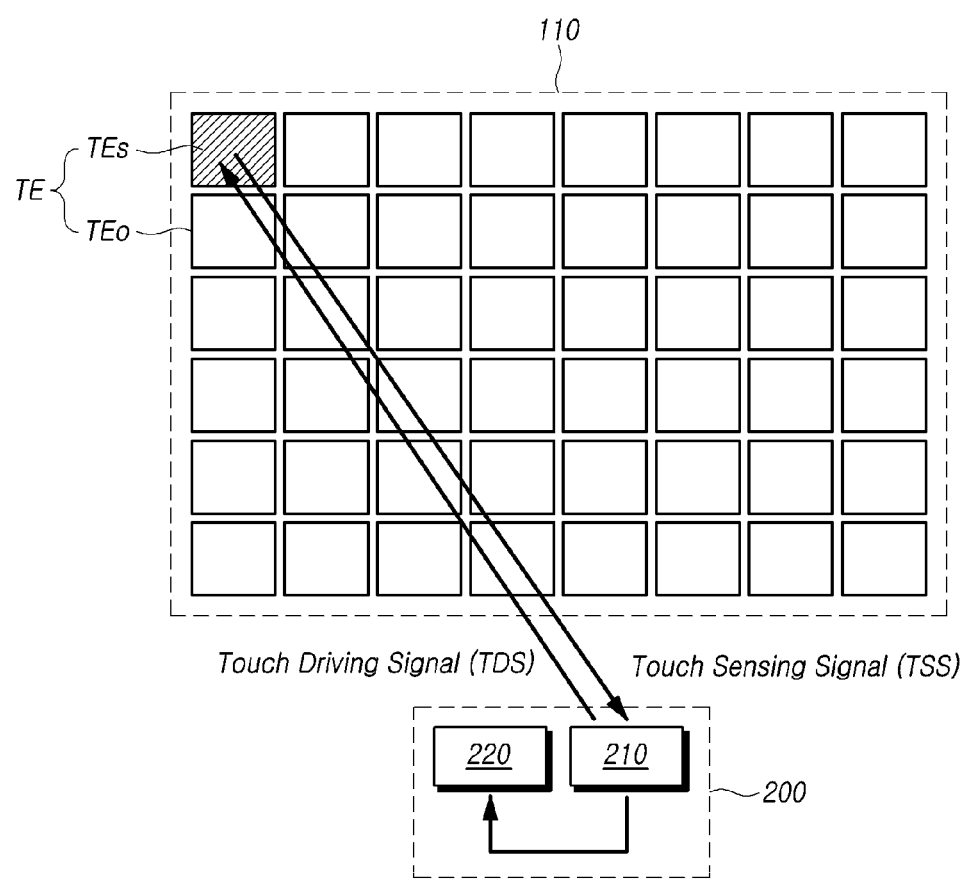
FIG. 2 illustrates an example of touch driving and sensing operations in the touch display device according to embodiments of the present disclosure.

FIG. 2 illustrates an example of touch driving and sensing operations in the touch display device according to embodiments of the present disclosure.

Referring to FIG. 2, the touch display device 100 according to embodiments of the present disclosure includes a plurality of touch electrodes TE serving as a touch sensor to provide a touch sensing function, a touch driving circuit 200 sensing a touch by sequentially driving the touch electrodes TE, and the like.

The touch driving circuit 200 can detect the touch presence and a touch coordinate by sequentially driving and sensing a plurality of touch electrodes TE in a touch sensing period in which touch sensing is performed.

More specifically, the touch driving circuit 200 can select one or more of a plurality of touch electrodes TE as touch electrodes TE to be sensed, and provide a touch driving signal TDS to the selected touch electrodes TEs. Thereafter, the touch driving circuit 200 can detect the touch presence or a touch coordinate by determining a change in capacitance (or a change in voltage, a change in an amount of charge, or the like) for each touch electrode TE based on touch sensing signals TSS received from each selected touch electrode TEs and each non-selected touch electrode TEo.

The touch driving circuit 200 can include, for example, a touch controller 220 controlling the generating of a signal related to touch sensing, and performing a process for detecting a touch presence and calculating a touch coordinate, a touch sensing circuit 210 providing a touch driving signal TDS to the display panel 110, detecting a touch sensing signal TSS from a touch electrode TE to which the touch driving signal TDS is provided, and providing the detected signal to a touch controller 220, and the like.

Here, the touch sensing period in which touch sensing is performed may be divided in time from a display driving period in which images are displayed on the display panel 110, or be concurrently performed with the display driving period.

Further, by providing an alternating current signal with the same phase and amplitude as the touch driving signal TDS to at least one data line and at least one gate line of the display panel 110 in the touch sensing period, a load-free driving for reducing parasitic capacitance formed through at least one touch electrode TE may be performed, and in this case, the touch driving signal TDS may correspond to a load-free driving signal.

Figure 3:
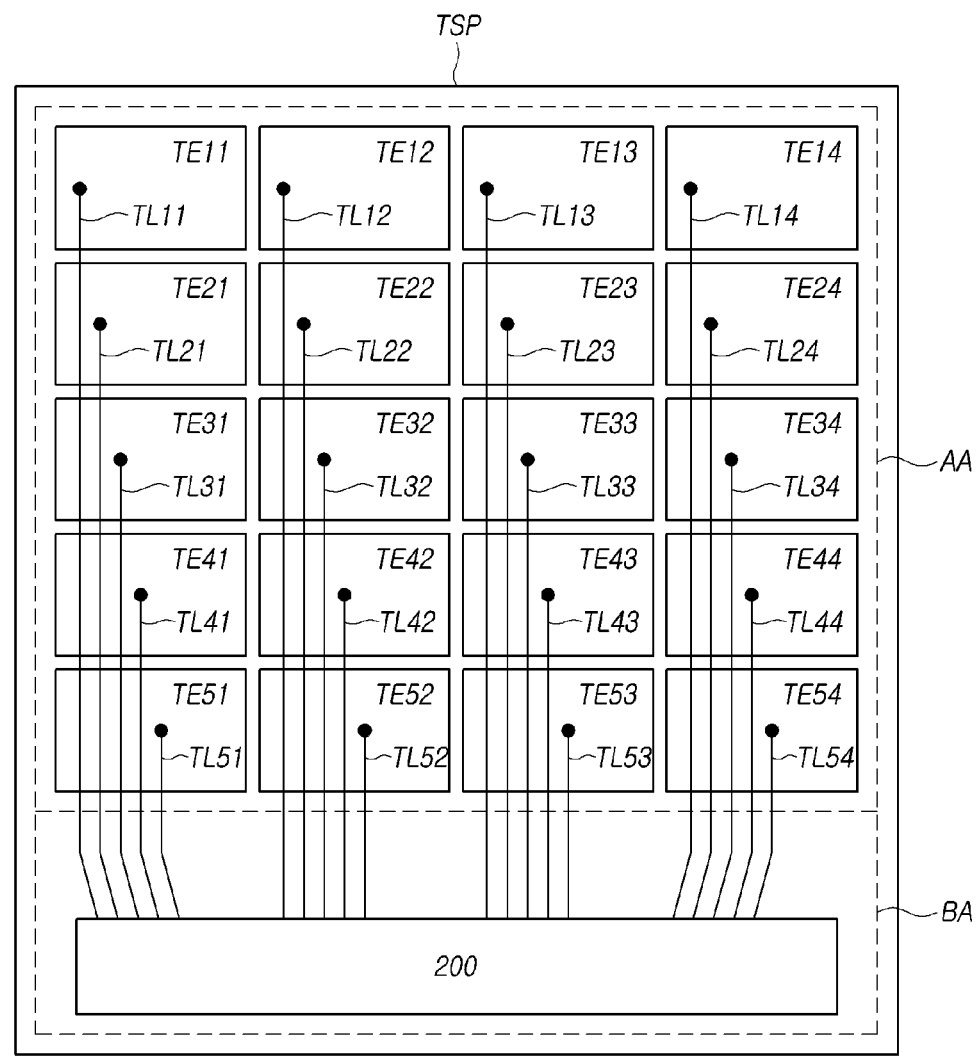
FIG. 3 is a plan view illustrating a touch panel in a touch display device to which a self-capacitance sensing scheme is applied according to embodiments of the present disclosure.

FIG. 3 illustrates a touch panel in a touch display device to which the self-capacitance sensing scheme is applied according to embodiments of the present disclosure.

Referring to FIG. 3, the touch display device 100 to which the self-capacitance sensing scheme is applied according to embodiments of the present disclosure includes a display panel 110 on which a plurality of touch electrodes TE and a plurality of touch lines TL are arranged, and a touch driving circuit 200 providing touch driving signals TDS to the touch electrodes TE and receiving touch sensing signals TSS from the touch electrodes TE.

The touch display device 100 may include an active area AA in which the plurality of touch electrodes (TE11~TE54) are arranged and a non-active area, such as a bezel area BA, located outside of the active area AA, on which the touch driving circuit 200 is located.

Here, an example of the touch electrodes TE arranged in 5 rows and 4 columns in the display panel 110 is discussed; however, this is just one example for convenience of description. For example, touch electrodes TE may be arranged in various structures in the display panel 110.

The plurality of touch electrodes (TE11~TE54) are arranged in a first direction x and a second direction y intersecting the first direction x in the active area AA, and a plurality of touch lines (TL11~TL54) are connected to the plurality of touch electrodes (TE11~TE54), respectively. The plurality of touch lines (TL11~TL54) extends to the bezel area BA from the active area AA in the second direction y and is connected to the touch driving circuit 200.

More specifically, a 1-1 touch line TL11 is connected to a touch electrode TE11 in a first row and a first column. The 1-1 touch line TL11 extends to the bezel area BA from the active area AA in the second direction y and is connected to the touch driving circuit 200. Further, a 2-1 touch line TL21 is connected to a touch electrode TE21 in a second row and the first column. The 2-1 touch line TL21 extends to the bezel area BA from the active area AA in parallel with the 1-1 touch line TL11 and is connected to the touch driving circuit 200. Likewise, a 3-1 touch line TL31 connected to a touch electrode TE31 in a third row and the first column, a 4-1 touch line TL41 connected to a touch electrode TE41 in a fourth row and the first column, and a 5-1 touch line TL51 connected to a touch electrode TE51 in a fifth row and the first column extend to the bezel area BA from the active area AA in parallel with the 1-1 touch line TL11 and the 2-1 touch line TL21, and are connected to the touch driving circuit 200.

Likewise, a touch electrode TE12 in the first row and a second column to a touch electrode TE52 in the fifth row and the second column, which are arranged in the second column, are connected to a 1-2 touch line TL12 to a 5-2 touch line TL52, respectively. The 1-2 touch line TL12 to the 5-2 touch line TL52 extend to the bezel area BA from the active area AA in parallel with one another, and are connected to the touch driving circuit 200.

Further, a touch electrode TE13 in the first row and a third column to a touch electrode TE53 in the fifth row and the third column, which are arranged in the third column, are also connected to a 1-3 touch line TL13 to a 5-3 touch line TL53, respectively. The 1-3 touch line TL13 to the 5-3 touch line TL53 extend to the bezel area BA from the active area AA in parallel with one another, and are connected to the touch driving circuit 200.

Further, a touch electrode TE14 in the first row and a fourth column to a touch electrode TE54 in the fifth row and the fourth column, which are arranged in the fourth column, are also connected to a 1-4 touch line TL14 to a 5-4 touch line TL54, respectively. The 1-4 touch line TL14 to the 5-4 touch line TL54 extend to the bezel area BA from the active area AA in parallel with one another, and are connected to the touch driving circuit 200.

Such a touch display device 100 may be implemented as an organic light emitting display device. The organic light emitting display device includes a plurality of sub-pixels defined by a plurality of gate lines and a plurality of data lines. Each of the sub-pixels includes an organic light emitting diode (OLED) that is a self-emissive, and the organic light emitting diode (OLED) includes an anode electrode, a cathode electrode, and an organic compound layer interposed between them. The organic compound layer may further include a hole-related layer and an electron-related layer, together with an emission layer. The hole-related layer may include a hole injection layer HIL and a hole transport layer HTL, and the electron-related layer may include an electron injection layer EIL and an electron transport layer ETL.

In a case where the touch display device 100 according to embodiments of the present disclosure is an organic light emitting display device, the display panel 110 may have a top emission structure in which light is guided to travel upwardly or a bottom emission structure in which light is guided to travel downwardly.

In the case of the touch display device 100 that is the organic light emitting display device, a plurality of touch electrodes TE is included in the display panel 110, and may be disposed on an encapsulation layer located over a transistor and an organic light emitting diode. Such an arrangement of the touch electrodes TE may be more suitable for the top emission structure.

In the case of the touch display device 100 that is the organic light emitting display device, the plurality of touch electrodes TE may be arranged on a substrate of the display panel 110, on which a thin film transistor (TFT) is disposed. For example, the plurality of touch electrodes TE may be an anode electrode of an organic light emitting diode included in the display panel 110, an electrode formed on a layer equal to the anode electrode, or an electrode located on at least one of various layers located over or under the anode electrode. Like this, a configuration in which the touch electrode TE is disposed over the substrate on which the thin film transistor is formed is more suitable for a case where the display panel 110 has the bottom emission structure.

A plurality of touch electrodes TE included in the touch display device 100 according to embodiments of the present disclosure may be formed in a plate type not having an opening, or a mesh type having openings for luminous efficiency of a sub-pixel SP. The plurality of touch electrodes TE may be transparent electrodes, or further include one or more transparent electrodes for luminous efficiency of sub-pixels SP. The plurality of touch electrodes TE included in the touch display device 100 according to embodiments of the present disclosure may be dedicated electrodes for touch sensing, or electrodes used for both display driving and the touch sensing.

According to embodiments of the present disclosure, a touch display device, a touch driving circuit and a touch driving method are provided which are capable of reducing power consumption and sensing time by sensing, in a code division form, touch sensing signals TSS provided from a plurality of touch electrodes TE through a plurality of touch lines TL in the self-capacitance sensing scheme.

Figure 4:
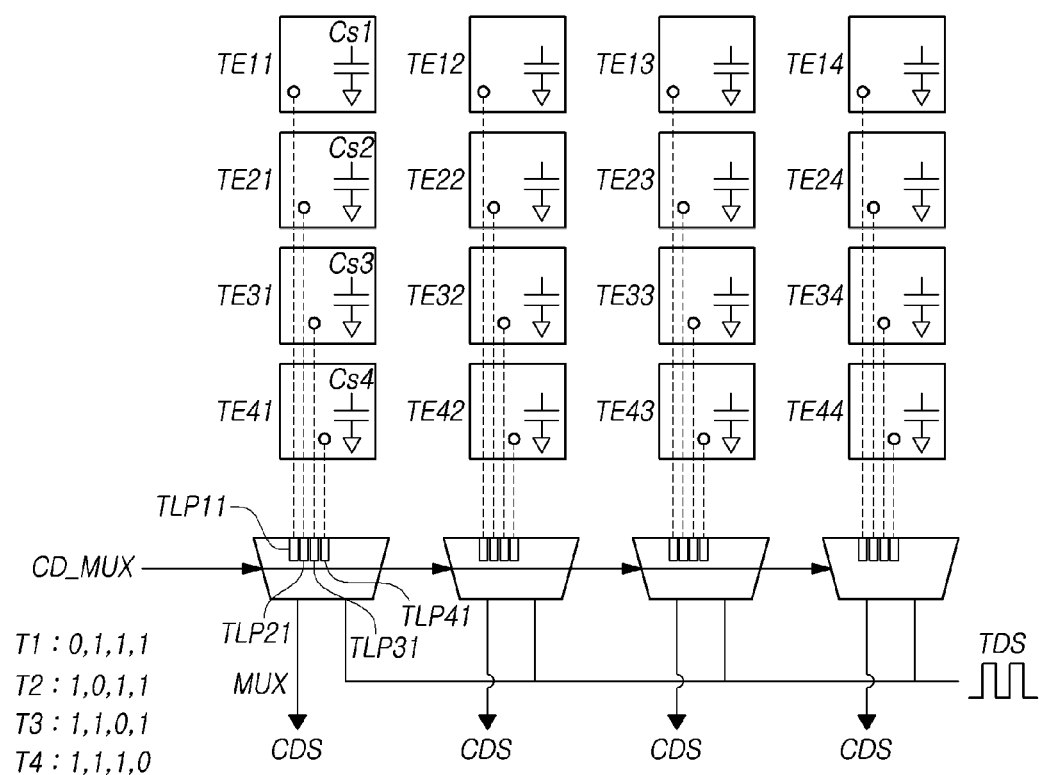
FIG. 4 illustrates a method of sensing a touch sensing signal in a code division form in a touch display device according to embodiments of the present disclosure.

FIG. 4 illustrates a method of sensing a touch sensing signal in a code division form in the touch display device according to embodiments of the present disclosure.

Referring to FIG. 4, the touch display device 100 according to embodiments of the present disclosure uses the self-capacitance sensing scheme, and each touch electrode TE serves as both a driving electrode and a sensing electrode. That is, by applying a touch driving signal TDS to a touch electrode TE through one touch line TL and receiving a touch sensing signal TSS provided from the touch electrode TE to which the touch driving signal TDS has been applied through the same touch line TL, the touch presence, a touch coordinate, and the like may be detected based on a change in capacitance formed between a pointer, such as a finger, a pen, or the like and the touch electrode TE.

The plurality of touch electrodes TE are connected to one multiplexer MUX through respective touch lines TL, and a touch sensing signal TSS from a touch electrode TE connected to a touch line TL selected by the multiplexer MUX is provided to a sensing unit of a touch sensing circuit 210.

To do this, the multiplexer MUX may include a plurality of touch line channel ports TLP to which a plurality of touch lines TL is connected for electrical connecting with the plurality of touch electrodes TE.

In the touch display device 100 according to embodiments of the present disclosure, by controlling the multiplexer MUX to which the plurality of touch electrodes TE is connected with signals orthogonal to each other over time, a code division sensing signal can be provided to the touch sensing circuit 210 through the multiplexer MUX.

For example, it is assumed that 4 touch electrodes (TE11, . . . , TE41) that correspond to a first touch electrode TE11 to a fourth touch electrode TE41 and are arranged in a first column are connected to touch line channel ports (TLP11, . . . , TLP41) of a multiplexer MUX of 4×1 through 4 touch lines TL, respectively.

The multiplexer MUX is connected to the 4 touch electrodes (TE11, . . . , TE41), and a touch driving signal TDS is applied to the touch electrodes (TE11, . . . , TE41) through the multiplexer MUX during a touch sensing period. Touch sensing signals TSS generated from the 4 touch electrodes (TE11, . . . , TE41) are provided to the touch sensing circuit 210 according to the controlling of the multiplexer MUX.

Here, touch electrodes TE to which a touch driving signal TDS is applied through the multiplexer MUX and touch electrodes TE from which the touch sensing signals TSS are received are controlled in code division pattern signals over time.

For example, by applying code division control signals CD_MUX of [0, 1, 1, 1] to the multiplexer MUX during a first time period T1, a touch driving signal TDS may be applied to the first touch electrode TE11 and touch sensing signals TDS provided from the second touch electrode TE21 to the fourth touch electrode TE41 may be provided to the touch sensing circuit 210. Here, the code division control signal CD_MUX of '0' applied to the multiplexer MUX is a control signal for applying a touch driving signal TDS to a corresponding touch line TL, and the code division control signal CD_MUX of '1' applied to the multiplexer MUX corresponds to a control signal for providing a touch sensing signal TSS from the corresponding touch line TL to the touch sensing circuit 210.

According to this, when the code division control signals of [0, 1, 1, 1] are applied to the multiplexer MUX during the first time period T1, the sum of touch sensing signals TSS provided from the second touch electrode TE21 to the fourth touch electrode TE41 is output as a code division sensing signal CDS of the multiplexer MUX and provided to the touch sensing circuit 210.

At this time, if self-capacitances formed through the first touch electrode TE11 to the fourth touch electrode TE41 are called Cs1 to Cs4, respectively, the code division sensing signal CDS1 provided to the touch sensing circuit 210 through the multiplexer MUX during the first time period T1 may become (Cs2+Cs3+Cs4)×Vex. Here, Vex is a peak-to-peak value of a touch driving signal TDS.

After the first time period T1 in which the code division control signals CD_MUX of [0, 1, 1, 1] have been applied to the multiplexer MUX, code division control signals CD_MUX of [1, 0, 1, 1] orthogonal to the code division control signals CD_MUX in the first time period T1 may be applied to the multiplexer MUX during a second time period T2.

As a result, the sum of touch sensing signals TSS provided from the first touch electrode TE11, the third touch electrode TE31 and the fourth touch electrode TE41 through the multiplexer MUX during the second time period T2 is provided to the touch sensing circuit 210 as a code division sensing signal CDS of the multiplexer MUX. Accordingly, the code division sensing signal CDS2 provided to the touch sensing circuit 210 through the multiplexer MUX during the second time period T2 may become (Cs1+Cs3+Cs4)×Vex.

Further, during a third time period T3, code division control signals CD_MUX of [1, 1, 0, 1] orthogonal to the code division control signals CD_MUX in the second time period T2 may be applied to the multiplexer MUX.

As a result, the sum of touch sensing signals TSS provided from the first touch electrode TE11, the second touch electrode TE21 and the fourth touch electrode TE41 through the multiplexer MUX during the third time period T3 is provided to the touch sensing circuit 210 as a code division sensing signal CDS of the multiplexer MUX. Accordingly, the code division sensing signal CDS3 provided to the touch sensing circuit 210 through the multiplexer MUX during the third time period T3 may become (Cs1+Cs2+Cs4)×Vex.

Further, during a fourth time period T4, code division control signals CD_MUX of [1, 1, 1, 0] orthogonal to the code division control signals CD_MUX in the third time period T3 may be applied to the multiplexer MUX.

As a result, the sum of touch sensing signals TSS provided from the first touch electrode TE11, the second touch electrode TE21 and the third touch electrode TE31 through the multiplexer MUX during the fourth time period T4 is provided to the touch sensing circuit 210 as a code division sensing signal CDS of the multiplexer MUX. Accordingly, the code division sensing signal CDS4 provided to the touch sensing circuit 210 through the multiplexer MUX during the fourth time period T4 may become (Cs1+Cs2+Cs3)×Vex.

Accordingly, the code division sensing signals provided to the touch sensing circuit 210 through the multiplexer MUX during the first time period T1 to the fourth time period T4 are represented as follows.

$$CDS1 = (Cs2+Cs3+Cs4) \times Vex$$

$$CDS2 = (Cs1+Cs3+Cs4) \times Vex$$

$$CDS3 = (Cs1+Cs2+Cs4) \times Vex$$

$$CDS4 = (Cs1+Cs2+Cs3) \times Vex$$

These can be expressed as a matrix as follows, and the code division control signals (CD_MUX) can be regarded as an encoding matrix with an orthogonal relationship.

$$\begin{bmatrix} CDS1 \\ CDS2 \\ CDS3 \\ CDS4 \end{bmatrix} = \begin{bmatrix} 0, & 1, & 1, & 1 \\ 1, & 0, & 1, & 1 \\ 1, & 1, & 0, & 1 \\ 1, & 1, & 1, & 0 \end{bmatrix} \begin{bmatrix} Cs1 \\ Cs2 \\ Cs3 \\ Cs4 \end{bmatrix} \times Vex$$

Accordingly, self-capacitances of the first touch electrode TE11 to the fourth touch electrode TE41 may be calculated as follows.

$$\begin{bmatrix} Cs1 \\ Cs2 \\ Cs3 \\ Cs4 \end{bmatrix} = 1/Vex \times \begin{bmatrix} 0, & 1, & 1, & 1 \\ 1, & 0, & 1, & 1 \\ 1, & 1, & 0, & 1 \\ 1, & 1, & 1, & 0 \end{bmatrix}^{-1} \begin{bmatrix} CDS1 \\ CDS2 \\ CDS3 \\ CDS4 \end{bmatrix} =$$

$$1/(3 \times Vex) \times \begin{bmatrix} -2, & 1, & 1, & 1 \\ 1, & -2, & 1, & 1 \\ 1, & 1, & -2, & 1 \\ 1, & 1, & 1, & -2 \end{bmatrix} \begin{bmatrix} CDS1 \\ CDS2 \\ CDS3 \\ CDS4 \end{bmatrix}$$

That is, the self-capacitances of the first touch electrode TE11 to the fourth touch electrode TE41 can be calculated based on a peak-to-peak value Vex of a touch driving signal TDS, magnitudes of code division sensing signals (CDS1, . . . , CDS4) provided to the touch sensing circuit 210 during respective time periods (T1, . . . , T4), and an inverse matrix of the code division control signals CD_MUX.

In particular, the inverse matrix of the code division control signals CD_MUX corresponds to a Hadamard matrix, a main diagonal (from top left to bottom right) of which has a value of −2, as a decoding matrix for calculating self-capacitances of the touch electrodes (TE11, . . . , TE41). The Hadamard matrix is a square matrix in which all components have a value of +1 or −1, and any two row vectors are orthogonal to each other. Since the main diagonal has a value of −2, a value corresponding to −2 can be obtained by shifting one bit on a bit in binary basis.

Accordingly, by using the inverse matrix of the code division control signals CD_MUX as a decoding matrix, self-capacitances (Cs1, . . . , Cs4) of respective touch electrodes (TE11, . . . , TE41) may be easily obtained from code division sensing signals (CDS1, . . . , CDS4) provided to the touch sensing circuit 210 over time.

That is, by applying code division control signals CD_MUX orthogonal to each other over time to the multiplexer MUX to which the plurality of touch electrodes (TE11, . . . , TE41) is connected, and sensing, in the code division scheme, touch sensing signals TSS generated from the touch electrodes (TE11, . . . , TE41), based on this, it is possible to calculate easily self-capacitances (Cs1, . . . , Cs4) of the respective touch electrodes (TE11, . . . , TE41).

As a result, since magnitudes of the code division sensing signals CDS provided to the touch sensing circuit 210 through the multiplexer MUX can be increased, even when self-capacitance sensing scheme is used, it is possible to improve a signal-to-noise ratio and to increase the sensitivity of touch sensing.

Further, since the code division sensing signals CDS provided to the touch sensing circuit 210 through the multiplexer MUX are based on the sum of touch sensing signals TSS provided from the plurality of touch electrodes TE, it is possible to remain or increase the sensitivity of touch sensing even when a peak-to-peak value of a touch driving signal TDS is reduced; in turn, it is possible to provide an advantage of reducing the power consumption of the touch display device 100.

Further, since the plurality of the touch electrodes TE is concurrently sensed, even which noises are included in touch sensing signals TSS, it is possible to remove easily these from the code division sensing signals CDS, and there is an effect of reducing a difference in sensing between touch electrodes TE.

Further, when individually sensing touch electrodes TE arranged in separate locations, the load of a touch electrode becomes different according to a distance spaced apart from the touch driving circuit 200, and due to this, there has been a problem that a difference caused by time delay in the process of providing a touch driving signal TDS or a touch sensing signal TSS occurs. However, since the touch display device 100 herein concurrently senses touch electrodes TE having different loads in the process of concurrently sensing a plurality of touch electrodes TE, it is possible to produce an effect of reducing a difference caused by time delay.

The touch display device 100 according to embodiments of the present disclosure may concurrently apply a touch driving signal TDS, through touch lines TL, to a pre-configured number of touch electrodes TE selected for touch sensing among a plurality of touch electrodes TE connected to one multiplexer MUX, during the first time period T1. Further, a load-free driving signal may be concurrently applied, through at least one touch line TL, to at least one touch electrode TE that does not perform touch sensing among the plurality of touch electrodes TE connected to the multiplexer MUX.

Further, a load-free driving signal may be applied to at least one of the plurality of touch electrodes TE to which the touch driving signal TDS has been applied in the first time period T1 among the plurality of touch electrodes TE connected to the multiplexer MUX, during the second time period T2. Further, the touch display device 100 according to embodiments of the present disclosure may apply a touch driving signal TDS to at least one of the at least one touch electrode TE to which the load-free driving signal has been applied in the first time period T1 among the plurality of touch electrodes TE connected to the multiplexer MUX, during the second time period T2.

In other words, the plurality of touch electrodes TE may be concurrently sensed through the one multiplexer MUX, and while a number of sensed touch electrodes TE are remained in a pre-determined number, sensing may be performed while changing touch electrodes TE to be sensed. Further, as touch electrodes TE on which sensing is performed are changed, it is possible to increase accuracy of touch sensing by applying a load-free driving signal to at least one touch electrode TE on which the sensing is not performed.

Here, the touch driving signal TDS and the load-free driving signal may have different amplitudes. For example, an amplitude of the touch driving signal TDS may be 1V, and an amplitude of the load-free driving signal may be 3V.

For another example, an amplitude of the touch driving signal TDS may be 1V, and an amplitude of the load-free driving signal may be 0.5V.

Further, the touch display device 100 according to embodiments of the present disclosure may further include a display panel 110 including a plurality of data lines and a plurality of gate lines. During a first time period T1 in the touch display device 100, a gate load-free driving signal with a same phase to a touch driving signal may be applied to gate lines overlapping with a plurality of touch electrodes TE to which the touch driving signal TDS is applied. Further, during the first time period T1 in the touch display device 100, a data load-free driving signal with a same phase to a touch driving signal may be applied to data lines overlapping with a plurality of touch electrodes TE to which the touch driving signal TDS is applied.

Here, the touch driving signal TDS and the gate load-free driving signal may have different amplitudes. For example, an amplitude of the touch driving signal TDS may be 1V, and an amplitude of the gate load-free driving signal may be 3V. For example, an amplitude of the touch driving signal TDS may be 1V, and an amplitude of the gate load-free driving signal may be 0.5V.

Here, the touch driving signal TDS and the data load-free driving signal may have different amplitudes. For example, an amplitude of the touch driving signal TDS may be 1V, and an amplitude of the data load-free driving signal may be 3V. For example, amplitude of the touch driving signal TDS may be 1V, and an amplitude of the data load-free driving signal may be 0.5V.

Meanwhile, the Hadamard matrix has a structure of 2×2, 4×4, 8×8, or 16×16. In some instances, a 10×1 multiplexer MUX may be used according to a type of the touch display device 100, and in this case, it may be difficult to use the Hadamard matrix to calculate self-capacitances (Cs1, . . . , Cs4) of respective touch electrodes (TE1, . . . , TE4) from a code division sensing signal CDS.

Like this, when a multiplexer MUX having a structure equal to the Hadamard matrix is not used, by using a cyclic code as code division control signals CD_MUX, a self-capacitance Cs of a touch electrode TE can be easily calculated.

Figures 5A, 5B:
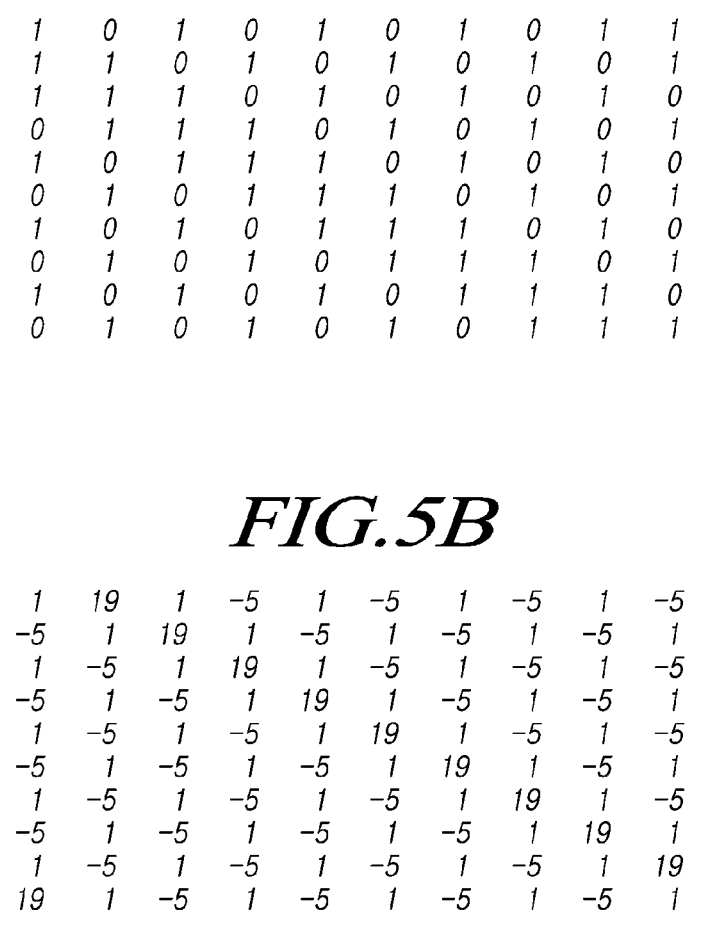

FIG. 5A and FIG. 5B illustrate examples of a cyclic code and a decoding matrix used as code division control signals in the touch display device according to embodiments of the present disclosure.

Referring to FIG. 5A and FIG. 5B, the touch display device 100 according to embodiments of the present disclosure may use code division control signals CD_MUX orthogonal to one another as an encoding matrix in order to control operations of a multiplexer MUX connected to a plurality of touch electrodes TE, and use an inverse matrix of the code division control signals CD_MUX as a decoding matrix used to calculate a self-capacitance Cs of a touch electrode TE from a code division sensing signal CDS provided from the multiplexer MUX by the code division control signals CD_MUX.

Here, since the number of multiplexers connected to touch electrodes TE may be different according to a type of the touch display device 100, the Hadamard matrix may be used as the decoding matrix when the number of multiplexers MUX corresponds to the Hadamard matrix; when the number of multiplexers MUX does not correspond to the Hadamard matrix, the decoding matrix may be configured to be similar to the Hadamard matrix by configuring code division control signals CD_MUX applied to a multiplexer MUX as a cyclic code.

That is, when configuring the code division control signals CD_MUX as a cyclic code of 10×10 as shown in FIG. 5A, an inverse matrix of this cyclic code has a structure as shown in FIG. 5B.

At this time, 5 of values except for 1 in the inverse matrix of the cyclic code may be obtained by summing a value shifted by 2 bits (the value of 4 is increased) based on the binary number system and its own value, and 19 may be obtained by summing a value shifted by 4 bits (the value of 16 is increased), a value shifted by 1 bit (the value of 2 is increased), based on the binary number system, and its own value.

Like this, even when the number of multiplexers MUX does not correspond to the Hadamard matrix, self-capacitance Cs may be effectively calculated from a code division sensing signal CDS provided from a multiplexer MUX in a situation where code division control signals CD_MUX are configured as a cyclic code.

Figure 6:
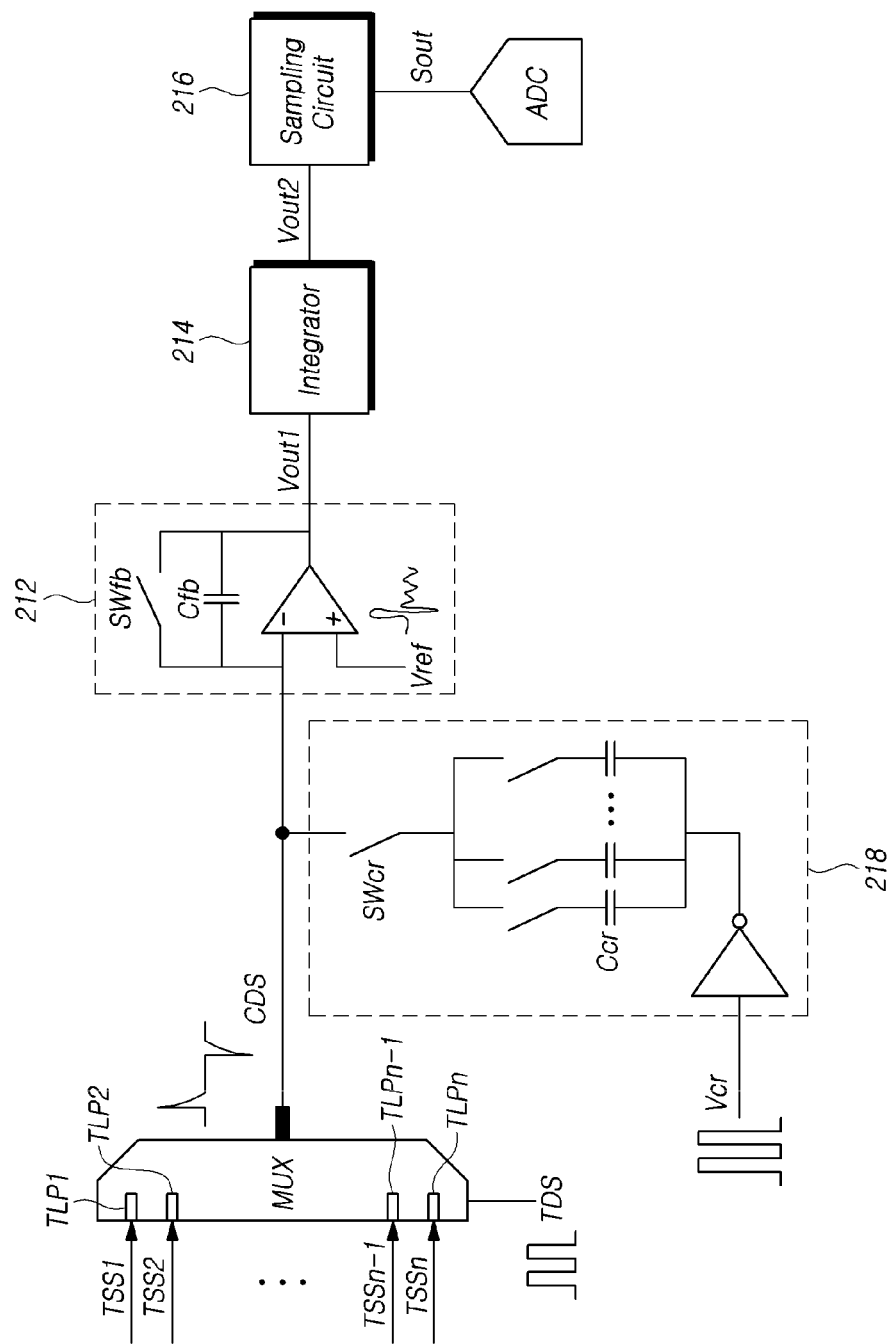
FIG. 6 illustrates a touch driving circuit of the touch display device according to embodiments of the present disclosure.

FIG. 6 illustrates a touch driving circuit of the touch display device according to embodiments of the present disclosure.

Referring to FIG. 6, the touch driving circuit 200 of the touch display device 100 according to embodiments of the present disclosure can perform touch sensing using switched-capacitor circuits in a charge transferring method.

The touch driving circuit 200 may include a multiplexer MUX, a preamplifier circuit (PreAmp, 212), an integrating circuit 214, a sampling circuit 216, and a charge remover 218.

An analog to digital converter ADC for converting a sensing voltage Sout to a digital value may be connected to an output terminal of the sampling circuit 216.

The multiplexer MUX is connected to a plurality of touch electrodes TE arranged in the display panel 110 through a plurality of touch lines TL, and a plurality of touch sensing signals (TSS1, . . . , TSSn) provided through a plurality of touch line channel ports (TLP1, . . . , TLPn) from the plurality of touch electrodes TE by code division control signals CD_MUX orthogonal to one another over time is added in the code division form and then, output as a code division sensing signal CDS.

The preamplifier circuit 212 may include an operational amplifier receiving the code division sensing signal CDS via an inverting input terminal (−), a feedback capacitor Cfb connected in parallel between the inverting input terminal (−) and an output terminal of the operational amplifier, and a feedback switch SWfb. A reference voltage Vref for comparing with the code division sensing signal CDS is applied to a non-inverting input terminal (+) of the operational amplifier, and an output voltage Vout1 from the preamplifier circuit 212 is provided to the integrating circuit 214.

At this time, the reference voltage Vref applied to the operational amplifier of the preamplifier circuit 212 may be a sine wave with a constant frequency or a square wave in the form of a pulse. Here, a peak-peak value Vp of the reference voltage Vref may be equal to or different from a peak-peak value Vex of a touch driving signal TDS.

The integrating circuit 214 may include a plurality of switches and at least one capacitor for accumulating the output voltage Vout1 from the preamplifier circuit 212, and the switches and the capacitor may be changeable to various structures.

The sampling circuit 216 may include a capacitor for charging an output signal Vout2 from the integrating circuit 214, and provide an voltage charged in the capacitor to the analog to digital converter ADC as a sensing voltage Vout by controlling at least one switch inside of the sampling circuit.

Further, in order to remove an initial electric charge remaining in the inverting input terminal (−) of the preamplifier circuit 212, the touch driving circuit 200 may include a charge remover 218. In case the number of touch electrodes TE or a capacity of a touch electrode TE is increased as in a display panel 110 with a large size, the output voltage Vout1 of the preamplifier circuit 212 becomes increases; due to this, the touch driving circuit 200 may be saturated beyond a limited range. In this case, the charge remover 218 for removing saturated electric charges may be connected to a front portion of the preamplifier circuit 212.

The charge remover 218 may be implemented as a structure in which a plurality of capacitors Ccr are connected in parallel to one another, and a charge-removing pulse voltage Vcr may be applied to that.

Figure 7A:
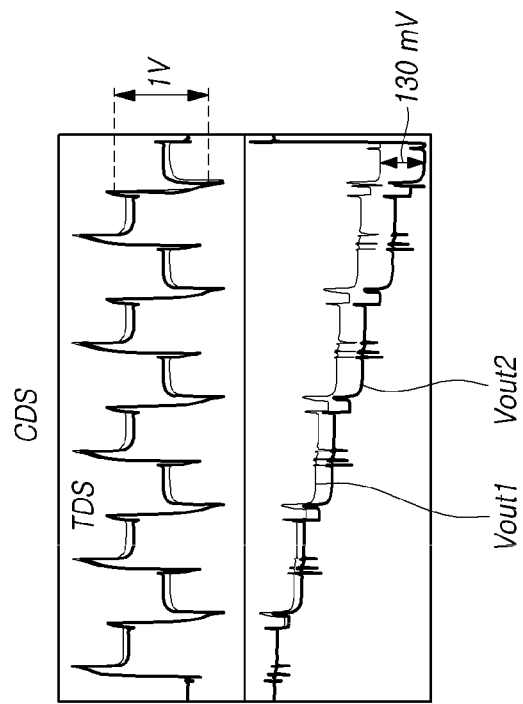
FIG. 7A and FIG. 7B are plots of comparing voltages output from the touch driving circuit when sensing a plurality of touch electrodes in the code division form in the touch display device according to embodiments of the present disclosure with those in typical cases.
Figure 7B:
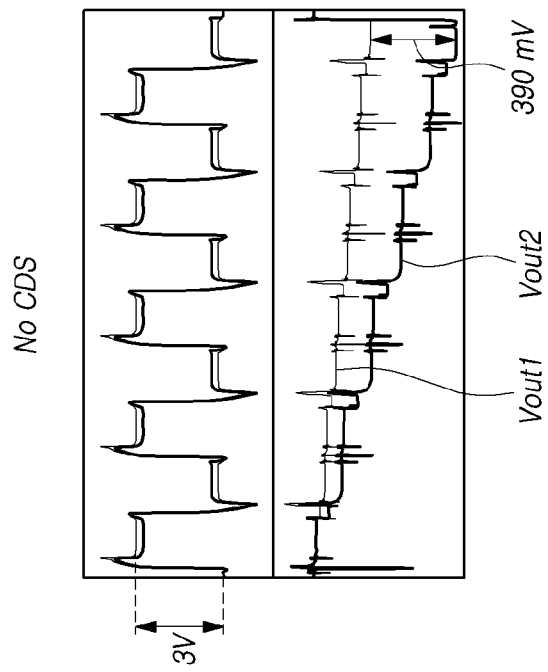

FIG. 7A and FIG. 7B are plots of comparing voltages output from the touch driving circuit when sensing a plurality of touch electrodes in the code division form in the touch display device according to embodiments of the present disclosure with those in typical cases.

Referring to FIG. 7A and FIG. 7B, in the touch display device 100 according to embodiments of the present disclosure, when sensing touch sensing signals TSS generated from a plurality of touch electrodes TE in the code division form, and generating a code division sensing signal CDS, since the touch sensing signals TSS generated from the plurality of touch electrodes TE are added in the code division form, even though a lower peak-to-peak value Vex of a touch driving signal TDS applied to the display panel 110 is set, it is possible to obtain a sensing signal Vout equal to that in a case where a touch sensing signal TSS from one touch electrode TE is sensed.

For example, FIG. 7A represents a typical case in which when a peak-to-peak value Vex of a touch driving signal TDS is set to 3V, a touch sensing signal TSS provided from one touch electrode TE is amplified to Vout1 through the preamplifier circuit 212, and the amplified signal Vout1 is accumulated through the integrating circuit 214 and provided as an output signal Vout2.

On the contrary, FIG. 7B represents a case which when a peak-to-peak value Vex of a touch driving signal TDS is set to 1V that corresponds to ⅓ of that in the typical case shown in FIG. 7A, according to embodiments of the present disclosure, touch sensing signals TSS provided from 4 touch electrodes (TE1, . . . , TE4) are added in the code division form over time, and in turn, a code division sensing signal CDS is generated.

As shown in FIG. 7B, in the touch display device 100 according to embodiments of the present disclosure, when adding touch sensing signals TSS provided from 4 touch electrodes (TE1, . . . , TE4) in the code division form and then generating the code division sensing signal CDS, it can be seen that a signal Vout1 output from the preamplifier circuit 212 is increased about 3 times when compared with the typical case. It can be understood that this is because, in one time period, the code division sensing signal CDS is generated through the adding of all touch sensing signals TSS provided from 3 touch electrodes TE.

Here, it can be noted that while the peak-to-peak value Vex of the touch driving signal TDS applied in the touch display device 100 according to embodiments of the present disclosure is 1V, the peak-to-peak value Vex of the touch driving signal TDS in the typical case is 3V; therefore, a voltage Vout2 accumulated through the integrating circuit 214 has a difference of about three times.

However, in the case of the touch display device 100 according to embodiments of the present disclosure, since a code division sensing signal CDS provided through a multiplexer MUX has a value about 3 times larger than the typical case of receiving a touch sensing signal TSS from one touch electrode TE, even when the peak-to-peak value Vex of the touch driving signal TDS has a level corresponding to ⅓ of that in the typical case, a sensing voltage Vout output through the touch driving circuit 200 during an same time period exhibits an almost same value.

Like this, in the touch display device 100 according to embodiments of the present disclosure, as the peak-to-peak value Vex of touch driving signal TDS is configured to be reduced, a sensing voltage Vout of the touch driving circuit 200 is improved while power consumption is reduced, and in turn, an effect of obtaining excellent touch sensing sensitivity can be provided.

Further, by generating the code division sensing signal CDS through the adding of touch sensing signals TSS provided from a plurality of touch electrodes TE in the code division form, a signal-to-noise ratio can be improved, and a difference between touch sensing signals TSS and sensing time can be reduced.

Meanwhile, in the touch display device 100 according to embodiments of the present disclosure, by using sine waves of various frequencies as a reference voltage Vref compared with the code division sensing signal CDS at the preamplifier circuit 212, it is possible to reduce noises due to harmonic components while avoiding noise in a certain frequency band.

Figure 8:
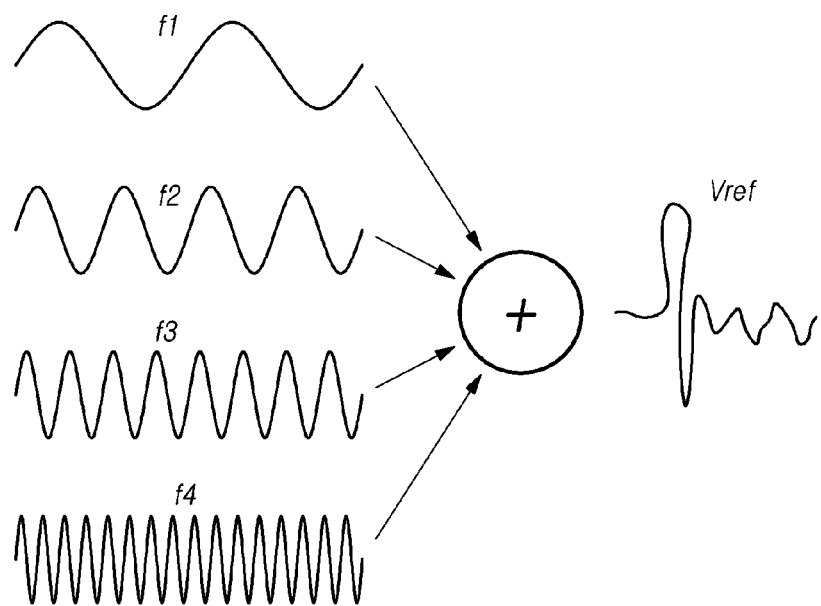
FIG. 8 illustrates an example of a case where a reference voltage for comparing with a code division sensing signal is made up of sine waves of a plurality of frequencies in the touch display device according to embodiments of the present disclosure.

FIG. 8 illustrates an example of a case where a reference voltage for comparing with a code division sensing signal is made up of sine waves of a plurality of frequencies in the touch display device according to embodiments of the present disclosure.

Referring to FIG. 8, in the touch display device 100 according to embodiments of the present disclosure, a code division sensing signal CDS provided to the preamplifier circuit 212 is compared with a reference voltage Vref applied to a non-inverting input terminal (+) of the operational amplifier, and in this case, a square wave in the form of a pulse, or sine waves of multiple frequencies, may be applied as the reference voltage Vref.

For example, the reference voltage Vref applied to the non-inverting input terminal (+) of the operational amplifier may be made up of sine waves of different frequencies (f1, f2, f3, f4); when sine waves of respective frequencies (f1, f2, f3, f4) are orthogonal to one another, since the respective frequency components can be easily separated, effective touch sensing can be performed.

At this time, the touch driving circuit 200 can separate a self-capacitance Cs of each touch electrode TE for each frequency by comparing between a code division sensing signal CDS and a reference voltage Vref, using a signal processing algorithm such as fast Fourier transformation (FFT).

Thereafter, the touch presence on the display panel 110 may be determined based on a separated self-capacitance Cs for each frequency, and a coordinate of a touch electrode TE at which the touch has occurred may be generated from a frequency for which it is determined that the touch has occurred.

Like this, by using sine waves of various frequencies as the reference voltage Vref compared with the code division sensing signal CDS at the preamplifier circuit 212, it is possible to reduce noises due to harmonic components while avoiding noise in a certain frequency band.

Meanwhile, the touch display device 100 may include the charge remover 218 in order to prevent saturation and to remove an initial electric charge remaining at the inverting input terminal (−) of the preamplifier circuit 212; however, in the touch display device 100, since a peak-to-peak value Vp of the reference voltage Vref applied to the preamplifier circuit 212 is configured to be different from a peak-to-peak value Vex of a touch driving signal TDS, without a separate charge remover 218, it is possible to prevent saturation and to remove an initial electric charge remaining at the preamplifier circuit 212.

Figure 9:
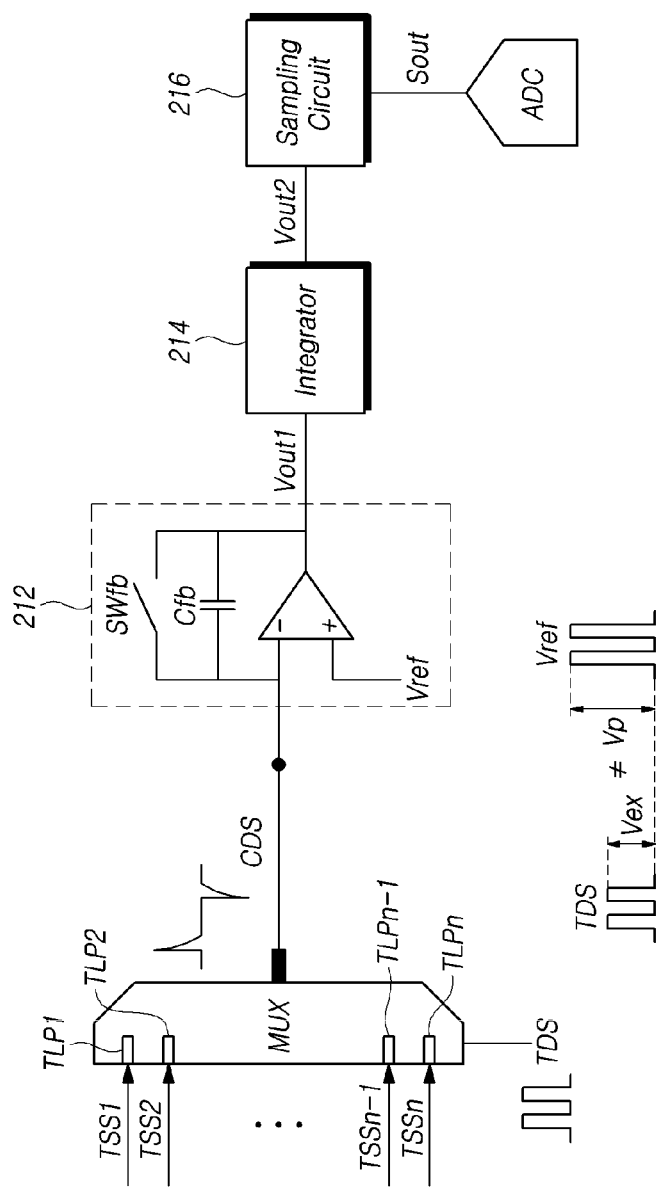
FIG. 9 illustrates a touch driving circuit when a reference voltage of a preamplifier circuit which is different from a peak-to-peak value of a touch driving signal is applied in touch display device according to embodiments of the present disclosure.

FIG. 9 illustrates a touch driving circuit when a reference voltage of a preamplifier circuit which is different from a peak-to-peak value of a touch driving signal is applied in touch display device according to embodiments of the present disclosure.

Referring to FIG. 9, in the touch display device 100 according to embodiments of the present disclosure, by setting a peak-to-peak value Vp of a reference voltage Vref applied to the preamplifier circuit 212 and a peak-to-peak value Vex of a touch driving signal TDS to be different from each other, a charge remover 218 may not be disposed inside of a touch driving circuit 200.

At this time, the reference voltage Vref with a value different from the touch driving signal TDS serves to remove electric charges of the preamplifier circuit 212; therefore, it may be referred to as a charge control signal.

For example, when a charge remover 218 is located at a front portion of the preamplifier circuit 212, a voltage Vout1 output from the preamplifier circuit 212 may be represented as follows.

$$Vout1 = \left(\left(\frac{kCp + Cfb}{Cfb}\right) \times Vex - \left(\frac{Ccr}{Cfb}\right) \times Vcr\right)$$

However, when a peak-to-peak value Vp of a reference voltage Vref compared with a code division sensing signal CDS at the preamplifier circuit 212 is set to have a value different from a peak-to-peak value Vex of the code division sensing signal CDS, even though a separate charge remover 218 is not provided, saturation can be prevented, and an initial electric charge remaining at the preamplifier circuit 212 can be removed.

That is, when the peak-to-peak value Vp of the reference voltage Vref compared with the code division sensing signal CDS at the preamplifier circuit 212 is set to have a value different from the peak-to-peak value Vex of the code division sensing signal CDS, an output value Vout1 of the preamplifier circuit 212 can be adjusted as follows, and due to this, it is possible to prevent the touch driving circuit 200 from being saturated beyond a limited range.

$$Vout1 = \left(\left(\frac{kCp + Cfb}{Cfb}\right) \times Vex - \left(\frac{(m-k)Cc}{Cfb}\right) \times (Vex - Vp)\right)$$

Here, k is the number of touch electrodes TE concurrently receiving touch sensing signals TSS by code division control signals CD_MUX, and m is the number of multiplexers MUX connected to the preamplifier circuit 212. Further, Cc is coupling capacitance between a node to which a touch driving signal TDS is applied and a touch line, and Cp represents capacitance formed through one or more touch electrodes TE.

At this time, the touch display device 100 according to embodiments of the present disclosure may apply a gate charge control signal to gate lines overlapping with a plurality of touch electrodes TE to which a touch driving signal TDS is applied, during a first time period T1. Further, the touch display device 100 according to embodiments of the present disclosure may apply a data charge control signal to data lines overlapping with a plurality of touch electrodes TE to which a touch driving signal TDS is applied, during the first time period T1. Further, the touch display device 100 according to embodiments of the present disclosure may apply a touch charge control signal to other touch electrodes TE overlapping with a plurality of touch lines TL connected with a plurality of touch electrodes TE to which a touch driving signal TDS is applied, during the first time period T1.

Further, the touch display device 100 according to embodiments of the present disclosure may apply a charge control signal to other electrodes adjacent to a plurality of touch electrodes TE sensed during a touch sensing period, in order to perform the role of a typical charge remover 218. That is, when a touch driving signal TDS is applied to a plurality of touch electrodes TE to be sensed, an amount of electric charges present in the plurality of touch electrodes TE to be sensed can be controlled by applying a charge control signal with an amplitude different from an amplitude of the touch driving signal TDS or a DC voltage signal of a predetermined level to data lines or gate lines arranged to be adjacent to the plurality of touch electrodes TE to be sensed, In other words, by controlling capacitance formed between the plurality of touch electrodes TE to be sensed and other electrodes disposed to be adjacent to them, it is possible to control an amount of electric charges in the plurality of touch electrodes TE to be sensed.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
   a touch panel including a plurality of touch electrodes and a plurality of touch lines;
   a multiplexer connected to the touch electrodes through the touch lines, the multiplexer configured to output a code division sensing signal obtained by adding, in a code division form, touch sensing signals provided from touch electrodes of the plurality of touch electrodes that are selected by a code division control signal; and
   a touch sensing circuit configured to:
      calculate capacitances in the plurality of touch electrodes based on the code division sensing signal from the multiplexer, and
      detect a touch presence or a touch coordinate.

2. The touch display device according to claim 1, wherein the touch panel is configured to be operated based on a self-capacitance touch sensing method, in which a touch driving signal and a touch sensing signal are provided through a same touch line of the plurality of touch lines that is connected to a touch electrode of the plurality of touch electrodes.

3. The touch display device according to claim 1, wherein the multiplexer includes a plurality of multiplexers, to each of which a sub-plurality of touch electrodes from the plurality of touch electrodes is connected as one group.

4. The touch display device according to claim 1, wherein the touch sensing circuit including:
   a preamplifier circuit including:
      an operational amplifier configured to receive the code division sensing signal through an inverting input terminal of the operational amplifier, the operational amplifier configured to receive a touch driving signal through an non-inverting input terminal of the operational amplifier,
      a feedback capacitor connected in parallel between the inverting input terminal and an output terminal of the operational amplifier, and
      a feedback switch;
   an integrating circuit including a plurality of switches and a plurality of capacitors, the integrating circuit configured to accumulate output voltages from the preamplifier circuit; and
   a sampling circuit configured to provide an output signal from the integrating circuit at any time.

5. The touch display device according to claim 4, wherein the touch driving signal is a sine wave signal including a plurality of frequency components.

6. The touch display device according to claim 4, wherein the touch driving signal has a first peak-to-peak value different from a second peak-to-peak value of a load-free driving signal that is applied to the plurality of touch electrodes through the multiplexer.

7. The touch display device according to claim 1, wherein the touch sensing circuit is configured to calculate the capacitances in the plurality of touch electrodes using a decoding code corresponding to an inverse matrix of the code division control signal.

8. A touch driving circuit, comprising:
a multiplexer connected to a plurality of touch electrodes through a plurality of touch lines, the multiplexer, in operation, outputting a code division sensing signal obtained by adding, in a code division form, touch sensing signals provided from touch electrodes of the plurality of touch electrodes that are selected by a code division control signal; and
a touch sensing circuit, in operation, calculating capacitances in the plurality of touch electrodes based on the code division sensing signal from the multiplexer, the touch sensing circuit, in operation, detecting a touch presence or a touch coordinate.

9. The touch driving circuit according to claim 8, wherein the multiplexer includes a plurality of multiplexers, to each of which a sub-plurality of touch electrodes from the plurality of touch electrodes is connected as one group.

10. The touch driving circuit according to claim 8, wherein the touch sensing circuit including:
a preamplifier circuit including:
an operational amplifier, in operation, receiving the code division sensing signal through an inverting input terminal of the operational amplifier,
a feedback capacitor connected in parallel between the inverting input terminal and an output terminal of the operational amplifier, and
a feedback switch,
wherein a touch driving signal is applied to a non-inverting input terminal of the operational amplifier;
an integrating circuit including a plurality of switches and a plurality of capacitors, the integrating circuit, in operation, accumulating output voltages from the preamplifier circuit; and
a sampling circuit, in operation, providing an output signal from the integrating circuit at any time.

11. A touch driving method, comprising:
applying code division control signals to a multiplexer connected to a plurality of touch electrodes through a plurality of touch lines;
outputting a code division sensing signal, through the multiplexer, which are obtained by adding, in a code division form, touch sensing signals provided from touch electrodes of the plurality of touch electrodes that are selected by the code division control signal; and
detecting a touch presence or a touch coordinate by calculating capacitances in the plurality of touch electrodes based on the code division sensing signal from the multiplexer.

12. A touch display device, comprising:
a touch panel including a plurality of touch electrodes and a plurality of touch lines; and
a touch driving circuit for sensing the touch electrodes through the touch lines,
wherein the touch driving circuit includes a first multiplexer including n touch line channel ports, wherein the n is a natural number greater than or equal to 3,
wherein the n touch line channel ports are electrically connected to n touch electrodes through n touch lines, respectively, and
wherein during a first period of the touch panel, a touch driving signal is concurrently applied to (n−k) touch electrodes among the n touch electrodes connected with the n touch line channel ports and a load-free driving signal with a same phase to the touch driving signal is concurrently applied to k touch electrodes, wherein the k is a number smaller than n by 1 or more.

13. The touch display device according to claim 12, wherein during a second period of the touch panel, the load-free driving signal is applied to at least one of the (n−k) touch electrodes to which the touch driving signal has been applied, and the touch driving signal is applied to at least one of k touch electrodes to which the load-free driving signal has been applied.

14. The touch display device according to claim 12, wherein an amplitude of the touch driving signal is different from that of the load-free driving signal.

15. The touch display device according to claim 12, further comprising a display panel including a plurality of data lines and a plurality of gate lines,
wherein during the first period of the touch panel, a gate load-free driving signal with a same phase to the touch driving signal is applied to gate lines of the plurality of gate lines that are overlapping with (n−k) touch electrodes to which the touch driving signal is applied, or during the first period of the touch panel, a data load-free driving signal with a same phase to the touch driving signal is applied to data lines of the plurality of data lines that are overlapping with (n−k) touch electrodes to which the touch driving signal is applied.

16. The touch display device according to claim 15, wherein an amplitude of the gate load-free driving signal is different from that of the touch driving signal, or an amplitude of the data load-free driving signal is different from that of the touch driving signal.

17. The touch display device according to claim 12, wherein during the first period of the touch panel, a gate charge control signal is applied to gate lines that are overlapping with (n−k) touch electrodes to which the touch driving signal is applied, or during the first period of the touch panel, a data charge control signal is applied to data lines that are overlapping with the (n−k) touch electrodes to which the touch driving signal is applied, or during the first period of the touch panel, a touch charge control signal is applied to other touch electrodes overlapping with (n−k) touch lines of the plurality of touch lines that are connected to the (n−k) touch electrodes to which the touch driving signal is applied.

18. The touch display device according to claim 17, wherein an amplitude of the gate charge control signal is different from an amplitude of the touch driving signal or an amplitude of a predetermined DC voltage,
wherein an amplitude of the data charge control signal is different from the amplitude of the touch driving signal or the amplitude of the predetermined DC voltage, and
wherein an amplitude of the touch charge control signal is different from the amplitude of the touch driving signal or the amplitude of the predetermined DC voltage.

* * * * *